United States Patent [19]

Mag et al.

[11] 4,230,630

[45] Oct. 28, 1980

[54] CONTINUOUS PROCESS AND APPARATUS FOR ADSORBENT BLEACHING OF TRIGLYCERIDE OILS

[75] Inventors: Theodore K. Mag, King City; Margaret P. Reid, Don Mills, both of Canada

[73] Assignee: Canada Packers Limited, Canada

[21] Appl. No.: 926,071

[22] Filed: Jul. 19, 1978

[51] Int. Cl.[2] .......... C09F 5/10; C11B 3/00

[52] U.S. Cl. .......... 260/428; 260/420; 210/219; 134/109; 366/165; 366/339

[58] Field of Search .......... 260/428, 420; 210/152; 134/109; 366/165, 339

[56] References Cited

U.S. PATENT DOCUMENTS

| | | | |
|---|---|---|---|
| 1,891,402 | 12/1932 | Craise et al. | 260/428 |
| 2,428,082 | 9/1947 | King et al. | 260/428 |
| 2,569,124 | 9/1951 | Christenson et al. | 260/428 |
| 2,724,580 | 11/1955 | Revallier | 366/165 |
| 3,673,228 | 6/1972 | Harris et al. | 260/428 |
| 3,704,006 | 11/1972 | Grout et al. | 259/4 |
| 3,780,076 | 12/1973 | Papahronis et al. | 260/420 |
| 3,995,838 | 12/1976 | Zucker | 366/165 |

*Primary Examiner*—John F. Niebling

*Attorney, Agent, or Firm*—Jesse B. Grove, Jr.

[57] ABSTRACT

Triglyceride oils are bleached rapidly and efficiently in a continuous system wherein a stream of the oil is preheated to bleaching temperature and is introduced into a mixing zone in such manner as to provide a swirling motion, bleaching adsorbent containing moisture is added to the surface of the swirling hot oil and water vapor or steam derived from the moisture in the adsorbent forms a protective atmosphere above the surface of the oil to protect it from oxidation. The oil-adsorbent mixture is pumped continuously from the mixer to a bleaching zone consisting of one or more static mixers, which may be unobstructed pipe sections, under flow conditions providing an average residence time of approximately one minute. The flow regime in the bleaching zone may be laminar or turbulent. Optionally, the oil-adsorbent mixture may flow continuously from the mixing zone to a vacuum dryer where it is deaerated and dried to optimum moisture content for bleaching prior to being pumped to the bleaching zone. Total time through the system may be in the order of less than three minutes. The advantages include simplicity of the operation, savings in time and ease of changing feedstocks.

32 Claims, 3 Drawing Figures

OIL
P
HEATER
CLAY
CLAY
VACUUM
FILTER
V
1
2
3
4
5
6
7
8
10
11
12
14
15
16
16a
17
18
19
20
21
22
23
24
25
26
27
28
29
30
31
32
33
34
35

CONTINUOUS PROCESS AND APPARATUS FOR ADSORBENT BLEACHING OF TRIGLYCERIDE OILS

BACKGROUND OF THE INVENTION

1. Field of the Invention

This invention relates to a continuous process and apparatus for the bleaching of triglyceride oils with a bleaching adsorbent.

2. Description of the Prior Art

In the processing of oils and fats for purposes of producing salad and cooking oils, and other edible oil products such as margarines and shortenings, it is necessary to bleach the oil with an adsorbent substance such as an adsorbent clay. The purpose of the bleaching process is to remove coloured materials from the oil, such as chlorophyll and chlorophyll breakdown products, brown-coloured compounds and other materials which may be sufficiently polar for removal from the oil by adsorption on the clay. If these compounds are not removed, the desired light colours cannot be achieved in the various oil and fat products mentioned above. Equally importantly, the chemical activity of these compounds can lead to the formation of additional coloured material, and to the formation of compounds which impart unacceptable flavours to the oil products. They must therefore be removed to very low levels.

It is generally not intended to remove carotene, which is a major contributor to the colour of most oils in the crude state, by this process. Carotene does not readily adsorb on bleaching clay, but it breaks down on heating to near-colourless (yellow) compounds. Hence, the high temperatures to which oils are exposed in the course of deodorizing after bleaching are relied upon to eliminate the strong carotene (red) colour of many oils.

The complexity and variety of the compounds to be removed by bleaching are such that it is not practical to analyze the bleached oil for them in detail to determine the effect of the process. Instead, it is customary to determine the colour of the oil after bleaching by comparison with Lovibond-Red standards as described in Bailey's Industrial Oil and Fat Products, Third Edit., (1964), pages 132 and 133. Because of the difficulties with colour comparisons in the presence of carotene, it is often desirable to determine the amount of chlorophyll left in the oil by analysis and to determine the peroxide value (PV) as a measure of primary oxidation products, and the anisidine value (AV) as a measure of secondary oxidation products in the bleached oil. If bleaching is performed inefficiently, or without proper protection from oxygen, it can be expected that coloured materials of a non-carotenoid nature such as chlorophyll are inadequately removed and that oxidation values will be relatively higher in the bleached oil.

Because of this complexity in evaluating bleached oils, the ultimate test must be an evaluation of the oil after deodorizing. At that stage, it is possible to assess the effect of the bleaching process properly with respect to colour since there is no longer any interference from carotenoid compounds. Also, the effect on flavour and flavour stability can be evaluated at this stage.

In a typical process of bleaching as carried out in the industry, adsorbent clay is mixed with the oil or liquified fat (hereinafter designated generically as oil) which usually has been subjected to a refining operation, the mixture is adjusted to the desired bleaching temperature and is held at this temperature for a sufficient length of time for adsorption of coloured material to take place to the maximum extent. At the end of this period the oil is filtered to remove the clay.

It is usually preferable to protect the oil from contact with air throughout the process, and particularly during that phase of the process when the oil is at maximum temperature and in contact with the bleaching clay. Usually, this is accomplished by processing under vacuum either in batch kettles or continuously in stirred, flow-through tanks which may be compartmented to achieve a degree of control over the residence-time of the oil/clay mixture. The use of vacuum also performs the important function of removing any air from the oil/clay mixture and of removing moisture. It is, however, important to avoid complete drying of the oil/clay mixture, since this reduces the adsorptive capacity of the clay according to many investigators (see, for example, Bailey's Industrial Oil and Fat Products, Third Edit., p. 780).

A bleaching process in which the bleaching action takes place under atmospheric or greater pressure is described in Harris et al, U.S. Pat. No. 3,673,228. In this process, there is a preliminary vacuum treatment which serves only to deaerate and to moisture-adjust the oil/clay mixture for optimum bleaching efficiency. This can be achieved by putting the oil/clay mixture through a vacuum-dryer rather than having the entire bleaching section of the process under vacuum. With this arrangement, more precise control of the moisture-adjusting phase of the process is possible, since there is no need to have the oil/clay mixture under vacuum during the entire bleaching phase of the process in order to maintain protection from air.

With conventional bleaching processes there are two serious difficulties. First, it is difficult to meter the bleaching clay, which is a fine powder, from ambient pressure into the evacuated vessel in which the oil/clay mixture is to be dried, or, in which both drying and bleaching are to take place. Usually this can be done by installing devices which measure-out a small quantity of clay and transfer it from ambient pressure into the evacuated vessel. This means that the bleaching operation must be semi-continuous, which is more complex mechanically. Another method, as suggested in Harris et al, U.S. Pat. No. 3,673,228, is to slurry the clay in a small quantity of the oil in a separate tank, and then meter this slurry continuously into the main oilstream. The disadvantage of this method is that changes in the oil-stocks to be bleached require also a change in slurry-stock, if contamination between oil-stocks is to be avoided, which complicates the process considerably. Also contact of a portion of the oil with the clay is far in excess of the optimum time and amount of clay, for bleaching.

The second difficulty arises with respect to the contact-time of the oil with the clay during bleaching. The selected residence-time of the oil-clay mixture in the bleaching zone in the usual conventional processes employed in the industry is in the range of about 5 to 30 minutes, depending on the type of oil and type of clay. Agitated tanks allow considerable short-circuiting and back-mixing with the result that the actual residence-time of the increments of the oil/clay mixture varies widely. The use of a packed column, as described in Harris et al U.S. Pat. No. 3,673,228, provides some improvement, but there is still considerable variation in residence time between different portions of the mixture. The result of this variation is that bleaching vessels are sized for rather long average-residence times. This makes it inevitable that portions of the oil are exposed to bleaching conditions for so long that certain reactions which produce coloured material in the course of bleaching can assume significant proportions. Consequently the bleaching process is then correspondingly less efficient. Also, packed columns do not allow for efficient oil/clay mixing and hence longer bleaching times must be allowed to achieve proper clay-utilization. The object of the present process is to overcome these disadvantages.

SUMMARY OF THE INVENTION

It has been found that in a process for continuous bleaching of oils the bleaching adsorbent can be added to the oil without having the oil under vacuum and still achieve protection from contact with air. Further it has been found that the contact of bleaching adsorbent with the oil can be reduced from the customary 5–30 minutes in a bleaching zone to about one minute. In the process, the oil is first heated to bleaching temperature in a heat-exchanger. It is then discharged into a mixing vessel under conditions to provide for vigorous swirling of the surface of the oil in the vessel. Preferably, the mixing vessel has a section or zone of conical configuration, such as a cyclone. The adsorbent, which invariably will contain some moisture, is dropped from a metering device onto the swirling oil-surface in the vessel where it is rapidly wetted by the heated oil. As the adsorbent comes in contact with the hot oil some of the water present in the adsorbent is volatilized. An atmosphere of water vapor or steam is produced in the head-space of the vessel over the surface of the oil. This atmosphere of steam or water vapor is constantly renewed and provides effective protection from air of the oil in the vessel.

The oil/adsorbent mixture may then be pumped directly into a bleaching zone or station which comprises a series of static mixers designed for rapid and efficient mixing as described below.

Alternatively, the oil/adsorbent mixture may be discharged continuously from the mixer into a vacuum dryer where any air entrained in the feed oil or introduced into the oil with the adsorbent is removed and where the oil/adsorbent mixture is dried to the desired moisture content. The desired moisture content is achieved by adjusting the vacuum in the dryer and, in addition, by adjusting the average residence-time of the oil/adsorbent mixture in the dryer. The dried mixture is then pumped to the bleaching zone or station.

The residence time in the bleaching zone is in the order of about 1 minute instead of the conventional 5–30 minutes in other bleaching processes. Efficient bleaching is achieved in this contact-time because of the excellent mixing and the very narrow residence-time distribution achieved in the static mixers. The oil/adsorbent mixture is then filtered.

BRIEF DESCRIPTION OF THE INVENTION

DETAILED DESCRIPTION OF THE INVENTION

Figures 1, 2, 3:
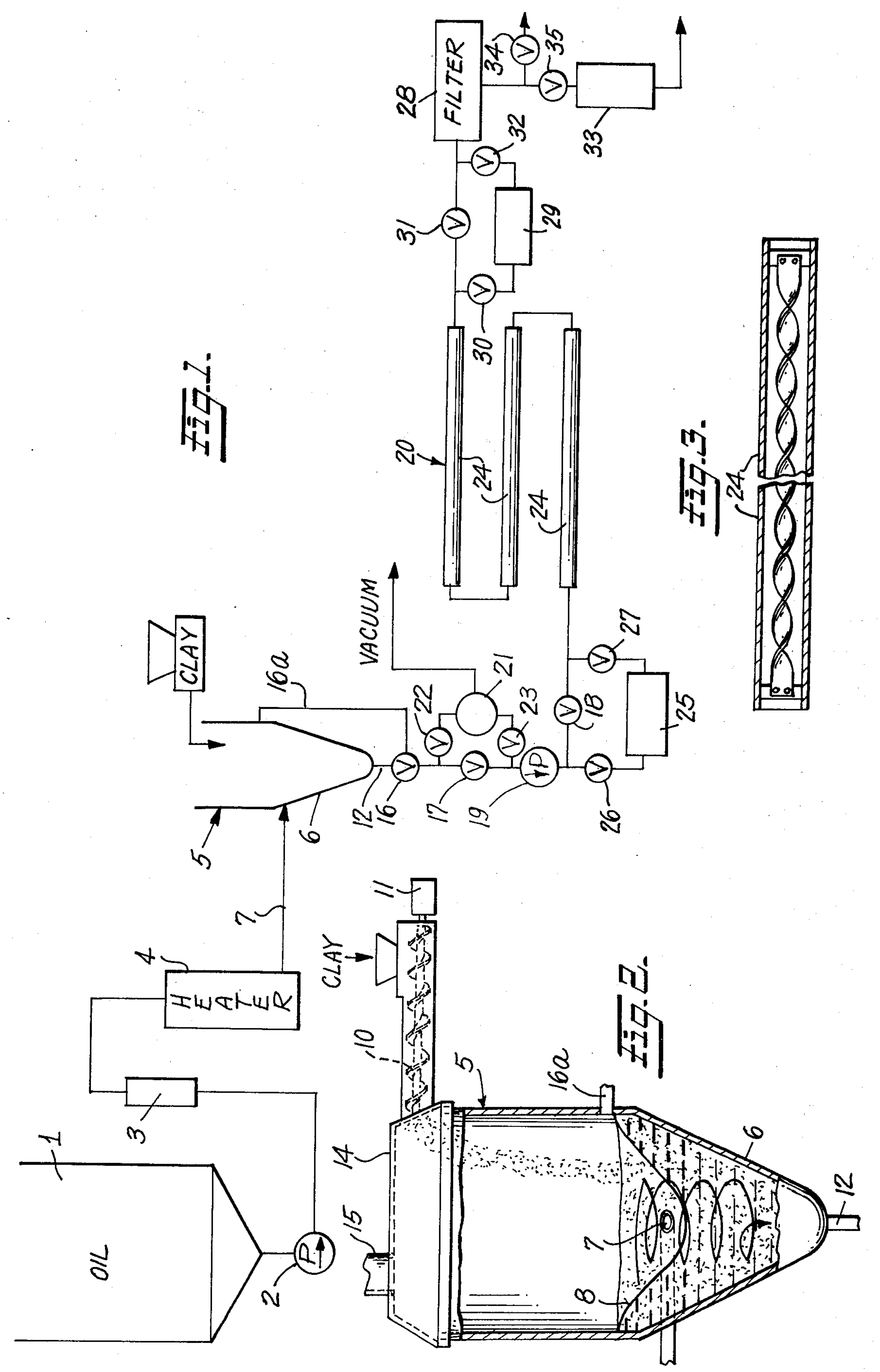
FIG. 1 is a diagrammatic illustration of the process steps and apparatus utilized in carrying out the preferred combination features of applicants' invention.
FIG. 2 is a detailed elevational view, partially in section, illustrating the preferred oil/clay mixing features of applicants' invention.
FIG. 3 is a fragmentary sectional view showing one embodiment of a static mixing device which may be used in the bleaching zone of applicants' process.

Referring to the drawings, and in particular to FIG. 1, a triglyceride oil, which may be, for example, an alkali-refined oil, hydrogenated oil, or phosphoricacid pretreated crude oil, is pumped from tank 1 by pump 2 through flow control device 3 to a heat-exchanger 4 where it is heated to bleaching temperature.

Bleaching tempertures may vary widely, depending on preference and upon the type of oil, but for the purposes of this invention the temperature should not be below 70° C. (160° F.). The preferred temperature range is from about 95° C. to about 105° C. (205° F.–220° F.).

The heated oil is discharged through pipe 7 into a mixing vessel 5, having a lower section 6 of conical configuration, e.g. a cyclone, at a pressure of at least 5 psig, trangentially to the wall of the vessel. The oil-level in the vessel 5 is controlled so as to submerge the oil discharge pipe. See FIG. 2 wherein the discharge end of the oil discharge pipe is below the surface 8 of the swirling oil. This avoids any spraying effect, and transmits the flow energy to the mass of oil contained in the cyclone to produce the swirling action which wets the adsorbent.

The amount of oil in the vessel 5 is preferably equivalent to approximately 10 seconds' flow of oil. In this instance the total capacity of the vessel 5 may be equal to about 40 seconds' flow of oil. It will be seen that the residence time of the oil in this vessel is less than one minute and is usually in the order of about 10 seconds.

As shown in FIGS. 1 and 2, a solid bleaching adsorbent in powder form, such as bleaching clay, is metered into the vessel 5 from a metering device 9. This device may comprise a screw type conveyor 10 (FIG. 2) driven at a controlled rate by any conventional means as shown schematically at 11. The solid adsorbent, as shown in FIG. 2, is continuously showered upon the surface 8 of the hot oil, is drawn into the vortex of the swirling oil and is rapidly and thoroughly mixed with the oil in its downward passage through the conical lower section 6 of the vessel 5. The oil/adsorbent mixture is then withdrawn from vessel 5 through the outlet 12 which is located in a lower region of the section 6.

The bleaching adsorbent used in the process can be any of those conventionally used in the art of bleaching triglyceride oils. Bleaching clays and, in particular, acid-activated bleaching clays such as those manufactured by the Filtrol Corporation of E. Washington Blvd., Los Angeles, Calif., are suitable for the process. These adsorbents, as supplied, usually contain about 10 to 15% of free moisture. Where the word "Filtrol" is used hereinafter, it will be understood to be the registered trademark of the Filtrol Corporation. However, any solid bleaching adsorbent which contains an amount of free moisture greater than about 3% can be used in the present process. This includes all of the presently known bleaching clays. This amount of moisture will be sufficient to provide the protective layer of water vapor or steam above the hot oil in the mixing vessel. When the moist adsorbent from the metering device 10 contacts the surface of the hot oil, water vapor or steam is substantially instantaneously generated to provide the protective atmosphere in the upper part of vessel 5 above the surface of the oil.

The amount of adsorbent may also be that conventionally used in known processes and will vary in accordance with the specific adsorbent and the type of oil being processed. In general, the amount of adsorbent will be within the range of about 0.2 to 3.0% by weight, based on the weight of the oil.

The vessel 5 may be entirely open at the top as shown in FIG. 1. However, the top of the vessel 5 may be provided with a hood, such as shown at 14 in FIG. 2, to confine dust and steam. It is not necessary that this hood be air tight and it may be vented as at 15 to the atmosphere or to an exhaust system. It will be understood that, while substantially atmospheric conditions as exist in an open top vessel are preferred, the mixing system may also be operated with slightly negative or positive pressures above the oil in the mixing vessel.

The oil/adsorbent mixture flows from the mixing vessel 5 through a level-control valve 16 which maintains the desired level of oil in the mixer 5. It may then be pumped directly through open valves 17 and 18 by pump 19 to the bleaching zone 20. The level-control valve may be responsive to level sensing means, shown diagrammatically by line 16*a*, to provide automatic level control.

Alternatively, the oil/adsorbent mixture may flow from the mixing vessel 5 through the level-control valve 16 into a conventional vacuum-dryer 21. This is accomplished by proper manipulation of valves 17, 22 and 23. The oil-level in the vessel 5 seals the vacuum-dryer 21 against the atmosphere. Any air entrained in the feed-oil and in the bleaching adsorbent is removed in the vacuum dryer 21, and the moisture content of the oil/adsorbent mixture may be adjusted to the desired concentration. The residence time of the oil/adsorbent mixture in the vacuum dryer 21 can be adjusted in the range of from a few seconds to about 1 minute depending on the amount of moisture to be removed. The pressure in the dryer can also be adjusted from ambient pressure (760 mm Hg absolute) to 50 mm Hg (about 2 inches Hg). The optimum moisture content for best bleaching efficiency varies with the type of oil to be processed. It is generally in the range of about 0.05 to 0.25% by weight. However, for many oils the preferred concentration is about 0.1% as measured in the bleached, filtered oil. Since the oil entering the process usually contains no more than about 0.2% moisture (as little as 0.03 to 0.05% in many instances) and much of the moisture added with the adsorbent has been vaporized in mixer 5, little or in many instances no moisture need be removed in the dryer 21. Therefore, residence time in this unit is very short or the unit is omitted entirely. It has been found that little or no air is entrained in the oil/adsorbent mixture during the described mixing procedure.

The deaerated and moisture-adjusted oil/adsorbent mixture is then pumped by means of pump 19 through the bleaching zone or section 20 which consists of a series of static mixers 24. If necessary, the oil/adsorbent mixture prior to entering the bleaching zone 20 may be pumped through a heat exchanger 25 for temperature adjustment to ensure that the temperature in the bleaching zone 20 is in the 70° C. to 180° C. range. This is accomplished by appropriate manipulation of valves 18, 26 and 27.

The static mixers 24 are preferably designed to provide for an average residence-time of about 1 minute, and for a residence-time distribution such that no more than 10% of the flow is less than 0.5 minutes in the bleaching section, and no more than 10% of the flow longer than 1.5 minutes. To achieve this residence-time distribution it is important that the static mixers be substantially free of elements that would cause back mixing and short circuiting such as would take place in the agitated tank or packed tower, i.e. that the forward flow of the oil-adsorbent mixture be substantially unimpeded. In addition it is of course necessary to choose the flow velocity such that no significant settling of clay can occur. This will depend on the type of clay used and on the arrangement of the bleaching section. Lower flow-velocities can be chosen without settling if the static mixers are arranged vertically. Higher velocities are required to prevent settling in a horizontal arrangement. These velocities, which can be calculated easily by one skilled in the art, depend on the particle-size of the bleaching clay and on the particle density. The flow may be laminar or turbulent.

Static mixers of a variety of designs, including empty pipe sections, may be used provided the proper residence-time distribution is achieved. A preferred design is the "Kenics" static mixer which has helical mixing elements approximately 1.5 pipe-diameters in length. A device utilizing helical mixing elements is shown in FIG. 3. A plurality of such elements arranged to provide sequential reversal in the direction of helical flow may be employed. Other designs available are those known as the "Ross"-mixer, the "Lightnin" mixer, the "Komax" mixer and the "Sulzer" (Koch) mixer.

After passing through the static mixers 24 of the bleaching zone 20, the oil-adsorbent mixture is filtered through a conventional filter 28. Filtering temperatures may vary widely. When filter-presses are used the heat-tolerance of the cloth may present a limitation. "Open-discharge" filter-presses require low filtering temperatures to protect the bleached, filtered oil from oxidation. In such instances the oil-adsorbent mixture may be passed through a heat exchanger 29 for cooling to appropriate temperature before filtering. This may be accomplished by suitable adjustment of valves 30, 31 and 32.

No temperature limitations exist with tank-filters provided the oil is passed through a heat-exchanger before contact with the atmosphere to cool the oil sufficiently to prevent oxidation. Therefore, it is preferred that filter 28 be of the tank-filter type and that the oil then be cooled in heat exchanger 33. Valves 34 and 35 can be manipulated to provide flow through heat exchanger 33.

The invention will be further illustrated by the following representative examples of practice:

EXAMPLE 1

Alkali-refined rapeseed oil was bleached at a rate of 420 pounds per hour (about 200 kg/hour) with 1.5% of an activated bleaching clay (Filtrol 105) according to the invention. The oil was first heated to 107° C. (225° F.) by passing it through a heat-exchanger. The heated oil was discharged into the mixing cyclone while simultaneously feeding the appropriate amount of clay into the top of the cyclone. The level of the oil/clay mixture in the cyclone was controlled to provide a seal for the vacuum-dryer, and to keep the oil discharge pipe into the cyclone submerged. This was equivalent to about 10 seconds average residence-time of the oil/clay mixture in the cyclone. The oil/clay mixture was discharged into the vacuum-dryer which was under about 50 mm Hg absolute pressure, and in which the level of the oil/clay mixture was controlled to allow about 1 minute adjusting of average residence time for deaeration and moisture. The oil/clay mixture was then pumped through the bleaching section which consisted of a series of static mixer modules sized to allow an average residence-time of 1 minute. After passing through the bleaching section the oil temperature was 100° C. (212° F.). Filtration took place at that temperature in a tank-filter. After filtration, the oil was cooled to 55° C. (130° F.) before discharging to atmosphere. The bleached oil was evaluated with respect to colour, peroxide value (PV) and anisidine value (AV). It was then deodorized and the deodorized oil was evaluated with respect to colour, anisidine value, flavour and Schaal-oven stability at 46° C. (115° F.). For comparison, a quantity of the same oil was batch-vacuum bleached for 15 minutes at 105° C. (220° F.) and filtered (conventional process), and similarly evaluated. The results from these test-runs are given in Table I.

TABLE I

BLEACHING OF ALKALI-REFINED RAPESEED OIL

| | Unbleached Oil | | | Bleached Oil | | | Deodorized Oil | | | |
|---|---|---|---|---|---|---|---|---|---|---|
| | PV me/kg | AV | Col. R (1") | PV me/kg | AV | Colour R (5¼") | Colour R (5¼") | AV | Flav. 7→1 | Flav. Stab. Schaal Days |
| Novel Process | 5.0 | 1.6 | 4.3 | 0.6 | 3.5 | 2.7 | 0.4 | 1.9 | 4-5 | 6-7 |
| Conventional Process | 5.0 | 1.6 | 4.3 | 0.4 | 6.1 | 2.3 | 0.5 (Slightly green) | 2.7 | 5 | 6-7 |

The above data show that the deodorized oil colour achieved with the oil bleached by the novel process was slightly better, particularly as far as removal of "green" compounds was concerned. Flavour and flavour stability were essentially equal from both processes, but the concentration of secondary oxidation products (as measured by AV) was lower from the novel process.

EXAMPLE 2

A second lot of alkali-refined rapeseed oil was bleached with 1.5% Filtrol 105 clay under the same conditions as described in Example 1, except that in one test-run no vacuum-drying was done and in a second test-run vacuum-drying was done at 500 mm Hg absolute pressure and with a residence time of only 20 seconds rather than 1 minute. A conventional, 15-minute batch vacuum-bleach (200 mm Hg absolute pressure) was done with the same oil for comparison. The results of these test-runs are given in Table II.

TABLE II

BLEACHING OF ALKALI-REFINED RAPESEED OIL

| | Unbleached Oil | | | Bleached Oil | | | Deodorized Oil | | | |
|---|---|---|---|---|---|---|---|---|---|---|
| | PV me/kg | AV | Col. R (1") | PV me/kg | AV | Colour R (5¼") | Colour R (5¼") | AV | Flav. 7→1 | Flav. Stab. Schaal Days |
| Novel Proc. (No Vacuum) | 8.4 | 1.9 | 4.5 | 0.4 | 3.6 | 1.5 | 0.5 | 1.9 | 5 | 10 |
| Novel Proc. (500 mm Hg) | 8.4 | 1.9 | 4.5 | 0.2 | 3.8 | 1.4 | 0.5 | 1.5 | 5 | 11 |
| Conv. Proc. (200 mm Hg) | 8.4 | 1.9 | 4.5 | 0.7 | 4.7 | 1.7 | 0.4 | 2.1 | 4-5 | 8 |

The data show that the deodorized oil colours from the two processes were equal. Flavour and flavour stability of the oils from the novel process were slightly better. Performing the process with or without vacuum-drying made no significant difference.

EXAMPLE 3

Alkali-refined soybean oil was bleached with 0.5% of an activated clay, as described in Example 1, except that the clay was different (Filtrol 4), the bleaching temperature was 105° C. (221° F.) and the pressure in the vacuum-dryer was 500 mg Hg absolute with an average residence-time of 20 seconds for moisture adjustment. A conventional, 15-minute batch-vacuum bleach was done at 200 mm Hg absolute pressure for comparison. The results are given in Table III.

TABLE III

BLEACHING OF ALKALI-REFINED RAPESEED OIL

| | Unbleached Oil | | | Bleached Oil | | | Deodorized Oil | | | |
|---|---|---|---|---|---|---|---|---|---|---|
| | PV me/kg | AV | Colour R (5¼") | PV me/kg | AV | Colour R (5¼") | Colour R (5¼") | AV | Flav. 7→1 | Flav. Stab. Schaal Days |
| Novel Process | 8.5 | 1.3 | 9.0 | 0.8 | 8.7 | 4.0 | 0.6 | 3.1 | 5 | 7 |
| Conventional Process | 8.5 | 1.3 | 9.0 | 4.8 | 5.0 | 6.4 | 0.6 | 3.3 | 6 | 5 |

The colour, AV, flavour and flavour stability of the deodorized oils from the two processes were essentially equal.

EXAMPLE 4

Alkali-refined peanut oil was bleached by the process of the invention substantially as described in Example 1, except that 1.3% Filtrol 4 was used and the temperature of the oil was 105° C. (221° F.). In one test 20 seconds residence time with 50 mm Hg absolute pressure was used in the vacuum-dryer. In a second test no vacuum drying was employed. The pressure in the vacuum dryer in this test was 760 mm Hg absolute. The same oil was also bleached by the conventional 15-minute batch-vacuum process at 105° C. (221° F.) at 100 mm Hg absolute pressure and at ambient pressure. The results are listed in Table IV.

TABLE IV

BLEACHING OF ALKALI-REFINED PEANUT OIL

| | Unbleached Oil | | | Bleached Oil | | | Deodorized Oil | | |
|---|---|---|---|---|---|---|---|---|---|
| | PV me/kg | AV | Colour R (5¼") | PV me/kg | AV | Colour R (5¼") | Colour R (5¼") | AV | Flav. 7→1 |
| Novel Proc. (50 mm Hg) | 22 | 4.0 | 4.0 | 0.8 | 18.0 | 1.5 | 1.0 | 7.1 | 6 |
| Novel Proc. (No Vacuum) | 22 | 4.0 | 4.0 | 0.0 | 15.1 | 1.6 | 1.0 | 5.7 | 6 |
| Conv. Proc. (100 mm Hg) | 22 | 4.0 | 4.0 | 2.8 | 15.3 | 1.5 | 1.0 | 7.3 | 6 |
| Conv. Proc. (No vacuum) | 22 | 4.0 | 4.0 | 2.8 | 10.7 | 1.5 | 1.2 | 7.1 | 5 |

The colours and flavours of the deodorized oils bleached by the novel process were identical to those achieved with the conventional vacuum-bleaching process. Conventional atmospheric bleaching gave slightly poorer colour and flavour. This shows that in conventional bleaching the use of vacuum is important for the protection of the oil during the process. It also shows that the method of clay addition used in the new process does not allow air-contact with the oil.

EXAMPLE 5

Alkali-refined corn oil was bleached with 0.8% Filtrol 4 clay with conditions substantially as described in Example 1. The temperature used was 105° C. (221° F.) and the pressure in the vacuum-dryer was 50 mm Hg absolute with a residence time of 20 seconds. For comparison, the same oil was also bleached by the conventional 15-minute batch-vacuum process at the same temperature and pressure. The results are listed in Table V.

TABLE V

BLEACHING OF ALKALI-REFINED CORN OIL

| | Unbleached Oil | | | Bleached Oil | | | Deodorized Oil | | |
|---|---|---|---|---|---|---|---|---|---|
| | PV me/kg | AV | Colour R (5¼") | PV me/kg | AV | Colour R (5¼") | Colour R (5¼") | AV | Flav. 7→1 |
| Novel Process | 6.0 | 1.2 | 9.5 | 1.8 | 2.6 | 2.5 | 0.7 | 1.4 | 5 |
| Conventional Process | 6.0 | 1.2 | 9.5 | 4.0 | 3.5 | 4.0 | 0.8 | 1.9 | 5-6 |

The deodorized oils from both bleaching processes were of similar quality with respect to colour, oxidation values and flavour.

EXAMPLE 6

Alkali-refined cottonseed oil was bleached with 2.0% Filtrol 105 under conditions substantially as described in Example 1. The bleaching temperature was 105° C. (221° F.) and in one test-run the pressure in the vacuum-dryer was 50 mm Hg, absolute, and in another test-run the pressure was 760 mm Hg. The residence-time in the vacuum-dryer was 1 minute in both tests. The same oil was also bleached by the conventional 15-minute batch-vacuum process. The bleached oils were analyzed for moisture content, in addition to the usual evaluation. Table VI gives the results.

TABLE VI

BLEACHING OF ALKALI-REFINED COTTONSEED OIL*

| | Unbleached Oil | | Bleached Oil | | | Deodorized Oil | |
|---|---|---|---|---|---|---|---|
| | PV me/kg | Colour R (1") | PV me/kg | Moisture % | Colour R (5¼") | Colour R (5¼") | Flav. 7→1 |
| Novel Proc. (50 mm Hg) | 3.6 | 5.5 | 0.2 | 0.065 | 6.9 | 3.4 | 5-6 |
| Novel Proc. (No Vacuum) | 3.6 | 5.5 | 0.6 | 0.120 | 3.9 | 2.0 | 5-6 |
| Conv. Proc. (100 mm Hg) | 3.6 | 5.5 | 0.0 | 0.025 | 11.0 | 4.7 | 4-5 |

*- Moisture content of the unbleached oil 0.07%

The data show that bleaching of alkali-refined cottonseed oil was very sensitive to the amount of moisture present in the system, as indicated by the moisture content of the bleached oil. The lower the moisture level in the oil the poorer the colour. In the conventional process there is an obvious difficulty to achieve optimum moisture adjustment while protecting the oil/clay mixture from air. In the process of the invention, this is easily achieved, since the use of vacuum is only required to obtain the optimum moisture level, but not to give protection from air. In the test-run using no vacuum a deodorized oil colour of 2.0R was achieved. This is an excellent result compared to 4.7R obtained in conventional 15-minute vacuum bleaching.

EXAMPLE 7

Crude, rendered lard was bleached as described in Example 1. Three different levels of Filtrol 4 bleaching clay were used, 0.76%, 0.9% and 1.5%. The bleaching temperature was 105° C. (221° F.) and the pressure in the vacuum-dryer was 50 mm Hg absolute. The residence time in the dryer was 1 minute. The same oil was bleached at all three clay-levels by the conventional batch-vacuum process for comparison, using a pressure of 100 mm Hg absolute. The results are given in Table VII.

TABLE VII

BLEACHING OF RENDERED, CRUDE LARD

| | Unbleached Oil | | | Bleached Oil | | | Deodorized Oil | | |
|---|---|---|---|---|---|---|---|---|---|
| | PV me/kg | AV | Colour R (5¼") | PV me/kg | AV | Colour R (5¼") | Colour R (5¼") | AV | Flav. 7→1 |
| Novel Proc. (0.76% Clay) | 11.0 | 3.0 | — | — | 4.6 | 1.4 | 1.2 | 2.8 | 5-6 |
| Novel Proc. (0.90% Clay) | 11.0 | 3.0 | — | 2.8 | 5.6 | 1.3 | 0.8 | 2.8 | 6 |
| Novel Proc. (1.50% Clay) | 11.0 | 3.0 | — | 0.6 | 5.0 | 0.8 | 0.7 | 1.9 | 6 |
| Conv. Proc. (0.76% Clay) | 11.0 | 3.0 | — | 2.8 | — | 2.2 | 2.2 | — | 5-6 |
| Conv. Proc. (0.90% Clay) | 11.0 | 3.0 | — | 2.0 | 4.2 | 1.7 | 1.8 | 2.3 | 4-5 |
| Conv. Proc. (1.50% Clay) | 11.0 | 3.0 | — | 2.0 | 4.4 | 1.3 | 1.1 | 2.3 | 6 |

The data show that the process of the invention achieved significantly lower bleached oil and deodorized oil colours at each level of clay usage than those achieved with the conventional bleaching process. AV's and flavours did not differ significantly with the two processes.

EXAMPLE 8

Crude palm oil was bleached, after a phosphoric acid pretreatment. The pretreatment with the acid was done continuously, also, and the bleaching-step followed immediately. The bleaching was done with 2.1% Filtrol 105 at 105° C. (221° F.) with the vacuum-dryer at a pressure of 50 mm Hg absolute. Residence-time in the vacuum-dryer was 1 minute and average residence-time in the bleaching zone was 1 minute. For comparison, the same oil was pretreated and immediately bleached by the conventional 15-minute batch-vacuum process at 75 mm Hg absolute pressure. Table VIII gives the results.

TABLE VIII

BLEACHING OF CRUDE, PHOSPHORIC ACID PRETREATED PALM OIL

| | Crude Oil | | | Pretreat.,Bl. Oil | | | Steam Ref./Deod. Oil | | |
|---|---|---|---|---|---|---|---|---|---|
| | PV me/kg | AV | Col. R (1") | PV me/kg | AV | Col. R (1") | Colour (5¼") | AV | Flav. 7→1 |
| Novel Proc. (2.1% Clay) | 9.0 | 30.4 | 13.5 | 0 | 16.4 | 5.2 | 2.6 | 5.0 | 6 |
| Novel Proc. (Dupl. above) | 9.0 | 30.4 | 13.5 | 0 | 19.4 | 5.5 | 2.7 | 7.1 | 6 |
| Conv. Proc. (2.1% Clay) | 9.0 | 30.4 | 13.5 | 0 | 21.4 | 6.0 | 3.0 | 8.6 | 5-6 |

Oils bleached by the process of the invention had lower colours and anisidine values after deodorizing than those of the oil bleached by the conventional process. Flavours were not significantly different.

A wide variety of oils, fats and waxes, as are customarily subjected to bleaching processes may be bleached by the method of the present invention. Where the word "oil" is used in the claims, it is intended that it include such substances. The bleaching process is particularly applicable to refined and/or hydrogenated edible oils and fats, such as rapeseed, soybean, peanut, corn, cottonseed, palm, and palm kernel oils, lard and edible tallow. However, the invention is not limited to these substances and may be used with advantage in those processes in which adsorbent bleaching of oils, and fats, whether edible or inedible, refined or unrefined, has been practiced.

What is claimed is:

1. In a continuous process of bleaching oil with bleaching adsorbent, the improvement comprising:
   preheating the oil to bleaching temperature in the range of approximately 70° C. to 180° C., continuously introducing the preheated oil to be bleached into a mixing vessel having an outlet in a lower region thereof in such manner as to cause the oil to swirl downwardly through said container, adding bleaching adsorbent containing moisture to said swirling oil whereby the oil and adsorbent are mixed in said vessel by the swirling movement of the oil and water is vaporized from the adsorbent and forms a protective atmosphere over the surface of the oil in the vessel to protect the heated oil from atmospheric oxidation, and withdrawing the mixture of oil and adsorbent from said vessel through said outlet.

2. The process of claim 1, wherein said oil is tangentially introduced into a mixing vessel having a lower section of conical configuration.

3. The process of claim 2, wherein said oil is introduced into said vessel in a region below the upper level of oil in said vessel.

4. The process of claim 1, wherein the top of said vessel is open to the atmosphere.

5. The process of claim 1, wherein said adsorbent is an activated bleaching clay having a free moisture content of greater than approximately 3%.

6. The process of claim 5, wherein said bleaching clay is continuously introduced onto the surface of the swirling heated oil.

7. The process of claim 5, wherein the oil is a triglyceride oil or fat.

8. In a continuous process for bleaching oil with bleaching clay, the improvement comprising:

heating the oil to bleaching temperature in the range of approximately 70° C. to 180° C., continuously introducing the heated oil tangentially into an upper region of a mixing vessel having a lower section of conical configuration, continuously introducing bleaching clay containing moisture onto the surface of the heated oil in said vessel and withdrawing the mixture of oil and clay from a lower region of said vessel, whereby moisture is vaporized from said clay and forms a layer of steam or water vapor over the oil in the vessel to protect it from atmospheric oxidation.

9. The process of claim 8, wherein said bleaching clay has a free moisture content of greater than approximately 3%.

10. The process of claim 8, wherein the oil and adsorbent pass through said mixing vessel during a time period of less than one minute.

11. A continuous process for bleaching oil comprising:

preheating a stream of oil to bleaching temperature, introducing said heated oil into a mixing zone having an outlet in a lower region thereof, introducing bleaching adsorbent containing moisture into the oil in said mixing zone, causing said oil and adsorbent to swirl through said mixing zone whereby the adsorbent is mixed with the oil and moisture is vaporized to form a protective layer above the surface of the oil in said zone, withdrawing the oil-adsorbent mixture through said outlet and introducing it into a bleaching zone comprising one or more static mixers, controlling the flow rate of the oil-adsorbent mixture through said bleaching zone such that no more than about 10% of the mixture remains in said bleaching zone for a time period greater than 1.5 minutes, and filtering the adsorbent from the bleached oil.

12. The process of claim 11, wherein the average residence time of the oil-adsorbent mixture in the bleaching zone is approximately one minute with no more than about 10% of the flow passing through the bleaching zone in less than 0.5 minutes and no more than about 10% of the flow passing through the bleaching zone requiring more than 1.5 minutes.

13. The process of claim 11, wherein the pressure in the mixing zone is substantially atmospheric pressure and the oil-adsorbent mixture is pumped under pressure through the bleaching zone.

14. The process of claim 11, wherein the oil-adsorbent mixture from the mixing zone is subjected to deaeration and moisture adjustment prior to introduction into the bleaching zone.

15. The process of claim 14, wherein the mixing zone is open to the atmosphere, the deaeration and moisture adjustment step is performed under vacuum and the oil-adsorbent mixture after deaeration and moisture adjustment is pumped under pressure through the bleaching zone.

16. The process of claim 14, wherein the overall time of the process through the mixing, deaeration and moisture adjustment and bleaching steps is less than about 3 minutes.

17. A continuous process for bleaching oil comprising:

preheating a stream of oil to a temperature in the range of 70° C. to 180° C., introducing the heated oil tangentially into a conical mixing zone, having an outlet in a lower region thereof, in such manner as to cause the oil to vigorously swirl downwardly through said zone, continuously adding bleaching clay containing moisture to the surface of said swirling hot oil whereby the oil and clay are mixed in said zone by the swirling movement of the oil and water is vaporized from the clay to form a protective atmosphere of water vapor or steam over the surface of the oil to protect the oil from atmospheric oxidation, withdrawing the oil-clay mixture through said outlet and introducing said mixture into a deaeration zone, deaerating the mixture and adjusting the moisture content of the oil in the deaeration zone, pumping the oil-clay mixture from the deaeration zone through a bleaching zone comprising one or more static mixers such that the average residence time of the mixture in the bleaching zone is no greater than approximately one minute, and filtering the clay from the oil.

18. The process of claim 17, wherein said oil is preheated to a temperature of between approximately 90° C. to 105° C.

19. A continuous process for bleaching oil comprising heating a stream of oil to bleaching temperature, passing said stream of heated oil into a mixing zone, adding bleaching clay to said heated oil in said mixing zone, the residence time of the oil and clay in said mixing zone being less than about one minute, passing the resultant oil/clay mixture through a bleaching zone comprising one or more static mixers which are substantially free of elements that would cause backmixing and short circuiting, at a flow velocity such that there is substantially no settling of the clay in the oil and such that no more than about 10% of the flow passes through said bleaching zone in less than 0.5 minutes and no more than about 10% of the flow through said zone requires more than 1.5 minutes, and filtering the clay from the bleached oil, the total time between clay addition in the mixing zone and filtration of the clay after bleaching being no more than about 3 minutes.

20. The process of claim 19, wherein said oil is heated to a temperature of about 90° C. to 105° C.

21. The process of claim 19, wherein the bleaching zone consists of one or more sections of pipe.

22. The process of claim 21, wherein the one or more sections of pipe contain no flow obstructions.

23. The process of claim 21, wherein the one or more sections of pipe comprise helical flow elements.

24. The process of any of claims 1, 11 and 17, wherein the oil is an alkali-refined edible oil.

25. The process of any one of claims 1, 11 and 17, wherein the oil comprises liquified lard or tallow.

26. The process of any one of claims 1, 11 and 17, wherein the oil is a phosphoric acid treated oil.

27. The process of claim 26, wherein the oil is phosphoric acid treated palm oil.

28. Apparatus for the adsorbent bleaching of oils, comprising means for heating said oil to bleaching temperature, a mixing vessel having a bottom section of conical configuration, means for introducing hot oil from said heating means tangentically into said mixing vessel to cause said oil to swirl therein, means for metering powdered solid adsorbent continuously into the top of said vessel upon the surface of the oil therein, an outlet in a bottom region of said mixing vessel, bleaching means comprising at least one static mixer, and means for transferring oil/adsorbent mixture from said outlet to said bleaching means.

29. Apparatus as defined in claim 28, comprising means to maintain a selected oil level in said mixing vessel, said means for introducing hot oil tangentially into said mixing vessel being arranged to introduce said oil below the selected oil level.

30. Apparatus as defined in claim 28, wherein said static mixer comprises a length of empty pipe.

31. Apparatus as defined in claim 28, wherein said static mixer comprises a pipe section having an internal helical flow element.

32. Apparatus as defined in claim 28, comprising a vacuum dryer located in the transfer means between said mixing vessel and said bleaching means.

* * * * *